United States Patent
Glöckner et al.

(10) Patent No.: US 11,959,052 B2
(45) Date of Patent: Apr. 16, 2024

(54) METHOD FOR RECOVERING BEER AND INSTALLATION FOR EXECUTING THE METHOD

(71) Applicant: FLOTTWEG SE, Vilsbiburg (DE)

(72) Inventors: Jan-Martin Glöckner, Eibelstadt (DE); Sebastian Kleespies, Attenkirchen (DE)

(73) Assignee: FLOTTWEG SE, Vilsbiburg (DE)

( * ) Notice: Subject to any disclaimer, the term of this patent is extended or adjusted under 35 U.S.C. 154(b) by 108 days.

(21) Appl. No.: 17/089,939

(22) Filed: Nov. 5, 2020

(65) Prior Publication Data

US 2021/0139822 A1 May 13, 2021

(30) Foreign Application Priority Data

Nov. 8, 2019 (DE) .......................... 102019130151.3

(51) Int. Cl.
  *C12C 7/26* (2006.01)
  *B04B 1/20* (2006.01)
  *C12C 7/28* (2006.01)

(52) U.S. Cl.
  CPC .................. *C12C 7/26* (2013.01); *B04B 1/20* (2013.01); *C12C 7/28* (2013.01)

(58) Field of Classification Search
  CPC ................................ C12C 7/26; B01D 21/26
  See application file for complete search history.

(56) References Cited

U.S. PATENT DOCUMENTS

2018/0320124 A1  11/2018  Müller-Auffermann et al.

FOREIGN PATENT DOCUMENTS

DE    102015220315 A1    4/2017
WO    WO 20018/058025    *  3/2018

OTHER PUBLICATIONS

"Getting more from less—Alfa Lavel Foodec decanter centrifuges in breweries" https://www.alfalaval.com/globalassets/documents/products/separation/centrifugal-separators/decanters/foodec_application_brewery.pdf?_ga=2.47060839.1518778327.1603331339-234127439.1571697156, (2006), downloaded Sep. 26, 2022. (Year: 2006).*
Werner, B. (DE 3228074—English Translation Google Patents (Year: 1984).*
Search Report (in German), dated Dec. 9, 2020, issued by the German Patent Office for Applicant's related German Patent Application No. DE102019130151.3, filed Nov. 8, 2019.
Wikipedia—Artikel, "*Separator*", Dec. 13, 2018. Full text available at: https://de.wikipedia.org/w/index.php?title=Separator_(Verfahrenstechnik)&oldid=183655711 (last accessed on May 8, 2023) (copy not enclosed).
Office Action (in German), dated Apr. 4, 2023, issued by the German Patent Office for Applicant's corresponding German Patent Application No. DE102019130151.3, filed Nov. 8, 2019.

* cited by examiner

*Primary Examiner* — Elizabeth Gwartney
(74) *Attorney, Agent, or Firm* — Bodner & Bodner, PLLC; Gerald T. Bodner; Christian P. Bodner

(57) ABSTRACT

The invention relates to a method for recovering beer from cold-hopped beer (20). According to the invention, the cold-hopped beer (20) is supplied to a decanting centrifuge (50) and is clarified by the decanting centrifuge (50) such that a separated solid substance (70) preferably preponderantly has hop sediments, and a liquid phase (80) is clarified beer.

12 Claims, 1 Drawing Sheet

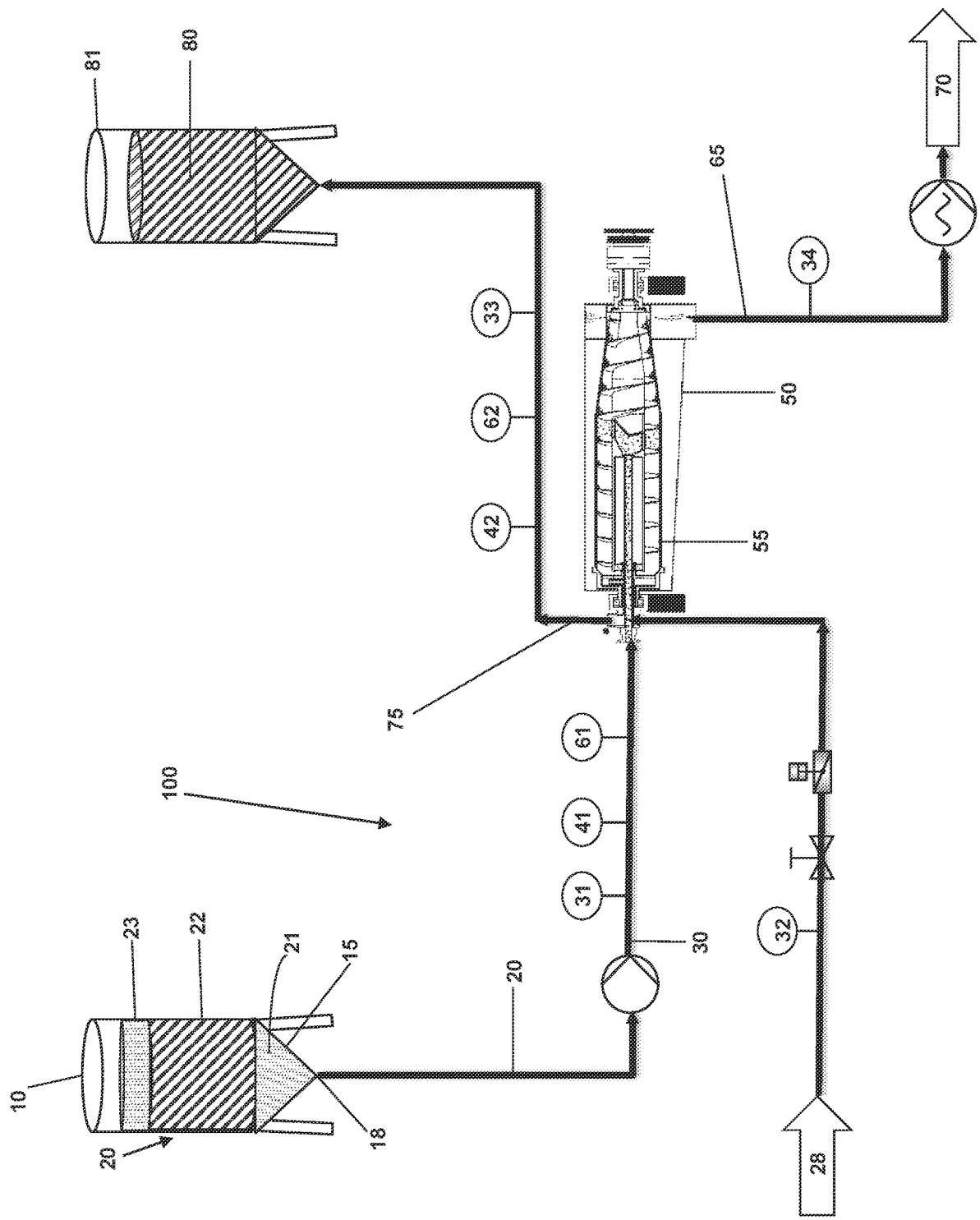

METHOD FOR RECOVERING BEER AND INSTALLATION FOR EXECUTING THE METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The invention relates to a method according to claim 1 for recovering beer from cold-hopped beer. Furthermore, the invention relates to an installation according to claim 8 for executing the method according to the invention.

(2) Description of Related Art

Since some time, a revival of so-called cold-hopping processes in manufacturing beer can be noticed. During cold-hopping, the addition of hops is not only performed in the hot area within the brewhouse, but also in a cold area, for example, in storage tanks.

At the same time, the economic interest of achieving a highest possible yield of clarified beer during the brewing process that is thus ready for bottling, increases in breweries.

BRIEF SUMMARY OF THE INVENTION

From the aforementioned, it is therefore a task of the present invention to propose a further developed method for recovering beer from cold-hopped beer. The method is intended to serve the yield improvement in the beer brewing process.

Furthermore, it is a task of the invention to propose an installation which serves for performing a method according to the invention for recovering beer.

The solution of the task of the invention is performed by a method for recovering beer from cold-hopped beer in accordance with the teaching of claim 1. Furthermore, the solution of the task of the invention is performed by an installation for executing the method according to the invention in accordance with the teaching of claim 8.

The dependent claims reflect at least appropriate configurations and further developments of the method according to the invention or the installation according to the invention.

The method according to the invention for recovering beer from cold-hopped beer provides that the cold-hopped beer is supplied to a decanting centrifuge and the cold-hopped beer is clarified by means of the decanting centrifuge such that a separated solid substance preferably preponderantly has hop sediments, and a liquid phase is clarified beer.

The method according to the invention thus serves for recovering beer from a kind of precursor beer product which is a precursor beer product of the cold-hopping process. As a cold-hopped beer, such a precursor beer product has to be understood which is first stored after a cold-hopping process. The cold-hopping process, for example, may reflect the addition of hops into the cold area of the brewing process.

The liquid phase obtained by virtue of the method according to the invention is clarified beer. In other words, the obtained centrate is clarified beer.

The cold-hopped beer is preferably stored within a storage tank. Particularly preferred, this storage tank has a tank cone. Before the cold-hopped beer is supplied to a decanting centrifuge, it is thus present in a storage tank. Within the storage tank, at least three phases of the cold-hopped beer may be present. These are a first phase with a hop sediment share to be separated and present within the tank cone, a second phase without any or with a low hop sediment share, and a third phase floating upon the second phase.

In an alternative embodiment of the invention, only the first and second mentioned phases are present within the storage tank. In particular in this embodiment of the method according to the invention, both phases of the cold-hopped beer are supplied to the decanting centrifuge.

In a further embodiment of the invention, the first phase and/or the third phase are/is clarified by means of the decanting centrifuge, wherein the hop sediment share of the first phase and/or the third phase is 10 to 80% by volume.

The first phase of the cold-hopped beer present within the storage tank is the phase of the cold-hopped beer which has the highest hop sediment share of the cold-hopped beer as compared, for example, to the two other phases (second phase and third phase).

The second phase of the cold-hopped beer, however, has no hop sediment share or only a low hop sediment share. The second phase of the cold-hopped beer may also be designated as a turbid beer phase. This turbid beer phase has no hop sediments or only a low share of hop sediments.

As compared to the second phase, the third phase of the cold-hopped beer has an increased hop sediment share. The hop sediment share of the third phase preferably is lower than the hop sediment share of the first phase of the cold-hopped beer. The third phase of the cold-hopped beer may also be designated as a hop flotate. This hop flotate preferably is present within the tank top.

The solid substance separated by the decanting centrifuge preponderantly has hop sediments. Furthermore, it is possible for the solid substance separated by the decanting centrifuge to have additionally yeast.

In a preferred embodiment of the invention, the solid substance separated by the decanting centrifuge is a mixture of hops and yeast. The separated solid substance preferably moreover has residual humidity or liquid.

The second phase of the cold-hopped beer preferably has at least a yeast share.

The second phase of the cold-hopped beer preferably may be clarified by means of a separator.

It is possible for the three phases of the cold-hopped beer which are present within a storage tank, to be treated and/or further processed differently.

The first phase of the cold-hopped beer which substantially is present within the tank cone, is discharged from a storage tank as a first phase. The first phase is preferably clarified by means of a decanting centrifuge.

The second phase which is discharged secondly from the storage tank is preferably clarified by means of a separator. In this respect, an installation provided for executing the method may have a corresponding switching element which conveys the cold-hopped beer in a controlled manner either to the decanting centrifuge or to a separator.

The third phase and preferably the last phase of the cold-hopped beer discharged from the storage tank is preferably clarified by means of the decanting centrifuge.

In a particularly preferred exemplary embodiment, the first phase and the third phase of the cold-hopped beer thus are clarified by means of the decanting centrifuge. Depending on the cold-hopped beer to be clarified, i.e. depending on the actual hop sediment share, it is possible for the second phase, as well, to be clarified by means of the decanting centrifuge.

In a further embodiment of the method according to the invention, the inlet of the cold-hopped beer to the decanting centrifuge, in particular the determination of the first phase and/or the second phase and/or the third phase, is performed depending on the turbidity value measured within an inlet portion and/or within the liquid outlet. The control of the inlet of cold-hopped beer to the decanting centrifuge may thus be performed depending on a measured turbidity value.

The first phase and/or the second phase and/or the third phase of the cold-hopped beer are/is different with respect to the turbidity value. Due to measuring a turbidity value, it may therefore be determined in a simple manner by means of the method according to the invention whether the cold-hopped beer situated within the inlet portion is present in a first phase or a second phase or a third phase. If a change with respect to the phase of the cold-hopped beer occurs, the inlet to the decanting centrifuge may be stopped or released.

It is furthermore possible for the clarification of the first phase in the decanting centrifuge to be terminated as soon as the turbidity value measured within the inlet portion falls below 1,900 to 1,700 EBC. It is furthermore possible for the clarification of the third phase in the decanting centrifuge to be started as soon as the turbidity value measured within the inlet portion rises above 1,900 to 2,100 EBC. EBC in this case is a turbidity unit used for beers in brewing. The indicated turbidity values are exemplary values. The determination or definition of the turbidity value is performed individually depending on the type of beer to be clarified and/or depending on the clarification values to be achieved.

Accordingly, it is possible for the clarification process of the cold-hopped beer to be performed in three steps. In a first step, the first phase of the cold-hopped beer, which has a high share of hop sediments, is clarified by means of the decanting centrifuge. This first step is performed until the turbidity value falls below a predetermined value.

In a second process step, the second phase of the cold-hopped beer is not clarified with the help of the decanting centrifuge. Rather, a clarification by means of a separator may be performed, for example.

In a third process step, after the second phase of the cold-hopped beer has been discharged, the third phase of the cold-hopped beer is clarified by means of the decanting centrifuge when a certain turbidity value is reached.

The method according to the invention furthermore may provide that a throughput through the decanting centrifuge is performed depending on the turbidity value measured within the inlet portion.

Furthermore, the throughput through the decanting centrifuge may be controlled depending on measured throughput values. The throughput values may be detected within the inlet portion and/or within the liquid outlet and/or within the output of solid substance.

In a further embodiment of the invention, the decanting centrifuge, in particular the drum of the decanting centrifuge, may be gassed with carbon dioxide ($CO_2$) during the clarification process. Dosing of the carbon dioxide ($CO_2$) preferably is performed depending on an oxygen value measured within the inlet portion to the decanting centrifuge and/or within the liquid outlet. Particularly preferred, dosing of the carbon dioxide is performed depending on a calculated difference of the oxygen value within the liquid outlet in relation to the oxygen value within the inlet portion. In other words, dosing of the carbon dioxide is performed depending on the measured oxygen absorption or oxygen increase.

Hence, an overlay or gassing the drum may be performed for avoiding an oxygen absorption. In order to be able to perform or control a dosing of the gassing with $CO_2$, a flow sensor preferably is provided within the carbon dioxide inlet with regard to the added $CO_2$.

It is possible for an increase of the gassing with $CO_2$ to be performed when an oxygen ($O_2$) value within the liquid outflow or within the output is increased.

The method according to the invention, for example, provides a maximum increase of dissolved oxygen of up to 20 ppb (parts per billion).

By virtue of the method according to the invention for recovering beer from cold-hopped beer, it is possible for the beer yield to be significantly increased in the cold-hopping process.

In a procedural test conducted by way of example, it was possible to clarify about 16,000 liters of cold-hopped beer situated within a storage tank. From these 16,000 liters, about 14,000 liters were a liquid precursor beer product, to which about 460 kg of hops were additionally added.

By virtue of the method according to the invention for recovering beer, it was possible to obtain additionally about 1,400 liters of recovered beer in this test. It was possible in this test to operate the decanting centrifuge at a throughput of up to 3,300 liters per hour.

By virtue of the method according to the invention, it is possible to achieve an increase of the yield of cold-hopped beer of up to 15% as compared to cold-hopped beer charges which are not supplied to a decanting centrifuge and are discharged from the storage tank in a conventional manner. The sediment share in the liquid outlet, for example, is substantially at 0.3 to 5.0% by volume. The dry substance (TS value) in the solid substance output in turn is at about 30 to 40% by weight.

The exemplary numbers prove that, with the help of the method according to the invention for recovering beer from cold-hopped beer, not only the yield with respect to a cold-hopped beer may be increased, but additionally no reductions in quality are present.

Of course, when there are different tank sizes and/or decanting centrifuges, different results and throughputs may be achieved.

A further aspect of the invention relates to an installation for executing the method according to the invention.

The installation comprises at least one storage tank having a tank cone, at least one decanting centrifuge, and at least one measuring unit preferably comprising flow sensors and/or turbidity sensors and/or oxygen sensors.

Furthermore, it is possible for the installation to have a carbon dioxide unit. The carbon dioxide unit has a carbon dioxide supply line into the decanting centrifuge, in particular into the decanter drum.

Furthermore, the installation according to the invention may have at least one separator.

Moreover, it is possible for the installation to have at least one carbon dioxide inlet. Furthermore, the installation may have an associated monitoring unit with respect to detecting the oxygen absorption during the execution of the clarification process.

Preferably, a decanting centrifuge of such a kind is used which enables solid substance to be discharged continuously, in particular a mixture of hops and yeast to be discharged continuously.

Hereinafter, the method according to the invention as well as the associated installation according to the invention will be described in more detail on the basis of a schematic representation.

BRIEF DESCRIPTION OF THE DRAWING

The FIGURE is a schematic representation in the form of a block diagram of an installation for executing a method for recovering beer in accordance with the present invention.

DETAILED DESCRIPTION OF THE INVENTION

In a storage tank 10 of an installation 100 according to the invention, cold-hopped beer 20 is present. The storage tank 10 in turn has a tank cone 15.

Within the storage tank 10, three phases of the cold-hopped beer 20 are present. The first phase 21 of the cold-hopped beer 20 is in this case the phase of the cold-hopped beer having an extremely high hop sediment share. The hop sediments deposit in the tank cone 15 within the storage tank.

Furthermore, a second phase 22 of the cold-hopped beer 20 can be recognized. This is in particular a turbid beer phase having no or only a low hop sediment share.

Overlying the second phase 22, there is a third phase 23 of the cold-hopped beer 20. This is a phase having in turn an increased hop sediment share as compared to the second phase 22. The third phase may also be designated as a hop flotate that is in particular present in the tank top, i.e. in the upper portion of the storage tank 10.

The storage tank 10 has an outlet 18. Via this outlet 18, the cold-hopped beer 20 reaches the inlet portion 30 of the installation. Since the outlet 18 is situated at the lower portion of the storage tank 10, the first phase 21, the second phase 22 and the third phase 23 of the cold-hopped beer 20 are discharged one after the other.

The installation 100 furthermore has a decanting centrifuge 50. Preferably, the installation 100 has a decanting centrifuge 50 of such a kind that enables solid substance to be discharged continuously. Apart from the hop sediment share, yeast sediments are also present within the cold-hopped beer 20. In this case, the major part of the yeast sediments is present within the tank cone.

With the help of the decanting centrifuge 50, the cold-hopped beer 20 is clarified such that the separated solid substance 70 preponderantly has hop sediments.

Preferably, yeast shares are further contained in the separated solid substance 70. The liquid phase 80 or the centrate in turn is clarified beer.

It is possible for all of the three phases 21, 22, 23 to be clarified by means of the decanting centrifuge 50.

A further embodiment of the invention provides that the first phase 21, which is preponderantly present within the tank cone 15, initially is first discharged via the outlet 18 and is conveyed to the decanting centrifuge 50.

In the inlet portion 30, a plurality of sensors is formed. These are a flow sensor 31, a turbidity sensor 41 and an oxygen sensor 61.

The first phase 21 preferably is supplied to the decanting centrifuge 50 until the turbidity value measured by the sensor 41 within the inlet portion 30 falls below a certain value. Subsequently, the second phase 22 of the cold-hopped beer 20 could be conveyed to a separator (not illustrated).

The second phase 22 may also be designated as a turbid beer phase. The clarification is then performed through the separator, for example. It is possible for other clarification processes or methods to be applied. If it is determined on the basis of the value detected by the turbidity sensor 41 that the turbidity value rises again above a certain value, the then present third phase 23 may be started to be clarified within the decanting centrifuge.

The hop sediment share of the first phase 21 and/or the third phase 23 is 10 to 80% by volume, for example. This hop sediment share causes certain turbidity values. By means of determining or detecting the turbidity values, it may thus be concluded which one of the three mentioned phases is present within the inlet portion 30 at the respective process time.

In the liquid output 75 which may also be designated as an outlet, sensors are likewise formed. These sensors may be a turbidity sensor 42, a flow sensor 33 and an oxygen sensor 62. Via the liquid output 75, the liquid phase 80/the centrate enters the tank 81. This tank 81 may be a pressure tank or a buffer tank.

The separated solid substance 70, which is a mixture of hops and yeast, enters a further depository via the solid substance output 65. Within the solid substance output or within the solid substance output portion 65, a flow sensor 34 is arranged, for example.

The installation 100 according to the invention further has a carbon dioxide inlet 28. The decanting centrifuge, in particular the decanter drum 55, preferably is gassed with carbon dioxide ($CO_2$) during the clarification process. Dosing of the carbon dioxide preferably is performed depending on an oxygen value measured within the inlet portion 30 and/or within the liquid output 75. For this purpose, the oxygen sensors 61 and 62 are formed. Due to the gassing with carbon dioxide, the absorption of oxygen ($O_2$) may be avoided in the decanter drum 55. Depending on the oxygen values measures by means of the sensors 61 and/or 62, monitoring of the oxygen content in the outlet or controlling of the oxygen absorption may be performed.

In the carbon dioxide inlet 28, a flow sensor 32 is further provided so that in this respect, as well, monitoring of the gassing with carbon dioxide may be performed.

The method according to the invention may provide that the regulation of the throughput amount through the decanting centrifuge 50 is performed depending on a turbidity value measured within the inlet portion 30.

LIST OF REFERENCE NUMERALS 10 storage tank
15 tank cone
18 outlet
20 cold-hopped beer
21 first phase
22 second phase
23 third phase
28 carbon dioxide inlet
30 inlet portion
31 flow sensor inlet portion
32 flow sensor carbon dioxide inlet
33 flow sensor liquid output
34 flow sensor solid substance output
41 turbidity sensor inlet portion
42 turbidity sensor liquid output
50 decanting centrifuge
55 drum
61 oxygen sensor inlet portion
62 oxygen sensor liquid output
65 solid substance output
70 separated solid substance
75 liquid output/outlet
80 liquid phase
81 tank
100 installation

SEQUENCE LISTING

Not Applicable

The invention claimed is:

1. A method for recovering beer from cold-hopped beer (20),
characterized in that
the cold-hopped beer (20) is supplied to a decanting centrifuge (50), and the cold-hopped beer (20) is clarified by the decanting centrifuge (50) such that a separated solid substance (70) preponderantly has hop sediments, and a liquid phase (80) is clarified beer,
characterized in that
the cold-hopped beer (20) is stored within a storage tank (10) having a tank cone (15), before it is supplied to the decanting centrifuge (50), wherein at least three phases (21, 22, 23) of the cold-hopped beer are present within the storage tank, namely a first phase (21) substantially present within the tank cone (15), the first phase (21) having a first hop sediment share to be separated, a second phase (22), and a third phase (23) floating upon the second phase (22), the third phase having a third hop sediment share,
wherein the second phase (22) has no hop sediments or a second hop sediment share that is lower than the first hop sediment share and the third hop sediment share, and
wherein the three phases (21, 22, 23) are discharged one after the other through an outlet (18) of the storage tank (10), which is situated at a lower portion of the tank (10), whereby the phase of the cold-hopped beer (20) is determined based on a measured turbidity value EBC of the cold-hopped beer (20),
wherein the three phases of the cold-hopped beer which are present within the storage tank, are clarified differently according to the measured turbidity value EBC.

2. The method according to claim 1,
characterized in that
at least the first phase (21) and/or the third phase (23) are/is clarified by means of the decanting centrifuge (50), wherein the hop sediment share of the first phase (21) and/or the third phase (23) is 10 to 80% by volume of the respective first phase and/or third phase of the cold-hopped beer (20) that is present in the storage tank (10).

3. The method according to claim 1,
characterized in that
the decanting centrifuge (50) is gassed with carbon dioxide $CO_2$ during the clarification process.

4. The method according to claim 1, wherein the turbidity value of the cold-hopped beer (20) is measured within an inlet portion (30) of the decanting centrifuge (50).

5. The method according to claim 4, which further comprises the step of:
regulating a throughput through the decanting centrifuge (50) based on the measured turbidity value of the cold-hopped beer (20).

6. The method according to claim 1, which further comprises the step of:
controlling the supply of the cold-hopped beer (20) to the decanting centrifuge (50) based on the measured turbidity value of the cold-hopped beer (20).

7. The method according to claim 1, which further comprises the step of:
measuring a turbidity value of a liquid output (75) of the decanting centrifuge (50).

8. The method according to claim 6, which further comprises the step of:
controlling the supply of the cold-hopped beer (20) to the decanting centrifuge (50) based on the measured turbidity value of the liquid output (75).

9. The method according to claim 6, which further comprises the step of:
determining the phase of the cold-hopped beer (20) based on the measured turbidity value of the liquid output (75).

10. The method according to claim 5, wherein a drum (55) of the decanting centrifuge (50), is gassed with carbon dioxide $CO_2$ during the clarification process.

11. The method according to claim 10, wherein dosing of the $CO_2$ is performed depending on an oxygen value measured within an inlet portion (30) of the decanting centrifuge (50) and/or within a liquid output (75) of the decanting centrifuge (50).

12. The method according to claim 3, wherein dosing of the $CO_2$ is performed depending on an oxygen value measured within an inlet portion (30) of the decanting centrifuge (50) and/or within a liquid output (75) of the decanting centrifuge (50).

* * * * *